(12) United States Patent
Wyatt et al.

(10) Patent No.: US 6,499,961 B1
(45) Date of Patent: Dec. 31, 2002

(54) SOLID STATE LIQUID LEVEL SENSOR AND PUMP CONTROLLER

(75) Inventors: Arnold G. Wyatt, Jackson, MI (US); Robert L. Terry, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/696,905

(22) Filed: Oct. 26, 2000

(51) Int. Cl.[7] ............................................... F04B 49/00
(52) U.S. Cl. ..................... 417/36; 417/40; 417/44.1; 417/32
(58) Field of Search ............................. 417/36, 40, 32, 417/44.1; 73/304 C; 307/118; 137/392; 340/620, 623, 624, 625

(56) References Cited

U.S. PATENT DOCUMENTS

| | | |
|---|---|---|
| 2,863,472 A | 12/1958 | Coles et al. |
| 2,871,874 A | 2/1959 | Coles et al. |
| 3,176,623 A | 4/1965 | Howerton et al. |
| 3,229,181 A | 1/1966 | Evans |
| 3,741,683 A | 6/1973 | McTamaney et al. |
| 3,916,213 A * | 10/1975 | Luteran ...................... 307/118 |
| 4,064,755 A | 12/1977 | Bongort et al. |
| 4,087,204 A | 5/1978 | Niedermeyer |
| 4,090,408 A | 5/1978 | Hedrick |
| 4,166,713 A * | 9/1979 | Debrey ......................... 417/36 |
| 4,171,932 A | 10/1979 | Miller |
| 4,191,951 A | 3/1980 | Fuzzell |
| 4,222,711 A | 9/1980 | Mayer |
| 4,228,427 A | 10/1980 | Niedermeyer |
| 4,232,998 A * | 11/1980 | Osgood ......................... 417/36 |
| 4,244,385 A | 1/1981 | Hotine |
| 4,265,262 A | 5/1981 | Hotine |
| 4,361,835 A | 11/1982 | Nagy |
| 4,444,545 A | 4/1984 | Sanders et al. |
| 4,454,454 A | 6/1984 | Valentine |
| 4,466,777 A | 8/1984 | Kimberlin |
| 4,527,107 A | 7/1985 | van der Pol et al. |
| 4,589,282 A | 5/1986 | Dumery |
| 4,729,086 A | 3/1988 | Lethellier |
| 4,742,244 A | 5/1988 | Koerner |
| 4,805,066 A | 2/1989 | Mergenthaler |
| 4,875,497 A | 10/1989 | Worthington |
| 4,881,873 A | 11/1989 | Smith et al. |
| 5,017,909 A | 5/1991 | Goekler |
| 5,035,581 A | 7/1991 | McGuire et al. |
| 5,064,347 A | 11/1991 | LaValley, Sr. |
| 5,078,577 A | 1/1992 | Heckman |
| 5,120,198 A * | 6/1992 | Clark .......................... 417/36 |
| 5,145,323 A | 9/1992 | Farr |
| 5,238,369 A | 8/1993 | Farr |
| 5,247,710 A | 9/1993 | Carder et al. |
| 5,266,838 A | 11/1993 | Gerner |
| 5,425,624 A | 6/1995 | Williams |
| 5,473,234 A | 12/1995 | Richardson |
| 5,478,966 A | 12/1995 | Sugi |
| 5,483,227 A | 1/1996 | Kuo et al. |

(List continued on next page.)

Primary Examiner—Henry Bennett
Assistant Examiner—Fadi H. Dahbour
(74) Attorney, Agent, or Firm—Baker & Daniels

(57) ABSTRACT

A liquid level controller for a device having a liquid reservoir includes a control board and a reservoir assembly. The reservoir assembly is disposed within the reservoir and includes a liquid level sensor, which is electrically connected to the control circuit. The control board includes a control circuit and a pump. The control circuit has a control circuit and a resistive power supply to power the control circuit. The control circuit controls the pump in response to signals from the level sensor and includes a CMOS logic gate and a MOSFET transistor to switch the pump. The control circuit further includes a second resistive power supply connected to a relay which controls an alarm. The second power supply is activated by a transistor responsive to an alarm signal from the level sensor, and powers the relay only when the alarm signal is present.

39 Claims, 3 Drawing Sheets

U.S. PATENT DOCUMENTS

| | | |
|---|---|---|
| 5,532,527 A | 7/1996 | Zatler et al. |
| 5,576,582 A | 11/1996 | White |
| 5,632,468 A * | 5/1997 | Schoenmeyr ............... 417/44.1 |
| 5,667,362 A | 9/1997 | Murai et al. |
| 5,672,050 A | 9/1997 | Webber et al. |
| 5,700,401 A | 12/1997 | Weinberg et al. |
| 5,791,880 A | 8/1998 | Wilson |
| 5,803,711 A * | 9/1998 | Schoenmeyr ................ 417/36 |
| 5,833,437 A | 11/1998 | Kurth et al. |
| 5,856,783 A | 1/1999 | Gibb |
| 5,860,790 A * | 1/1999 | Wang .......................... 417/32 |
| 5,883,489 A * | 3/1999 | Konrad ........................ 417/36 |
| 5,945,802 A * | 8/1999 | Konrad et al. ................ 417/36 |
| 5,975,854 A | 11/1999 | Culp, III et al. |
| 6,017,194 A | 1/2000 | North, Jr. |
| 6,254,350 B1 * | 7/2001 | Koenig et al. ................ 417/36 |
| 6,264,431 B1 * | 7/2001 | Triezenberg ................ 417/36 |

* cited by examiner

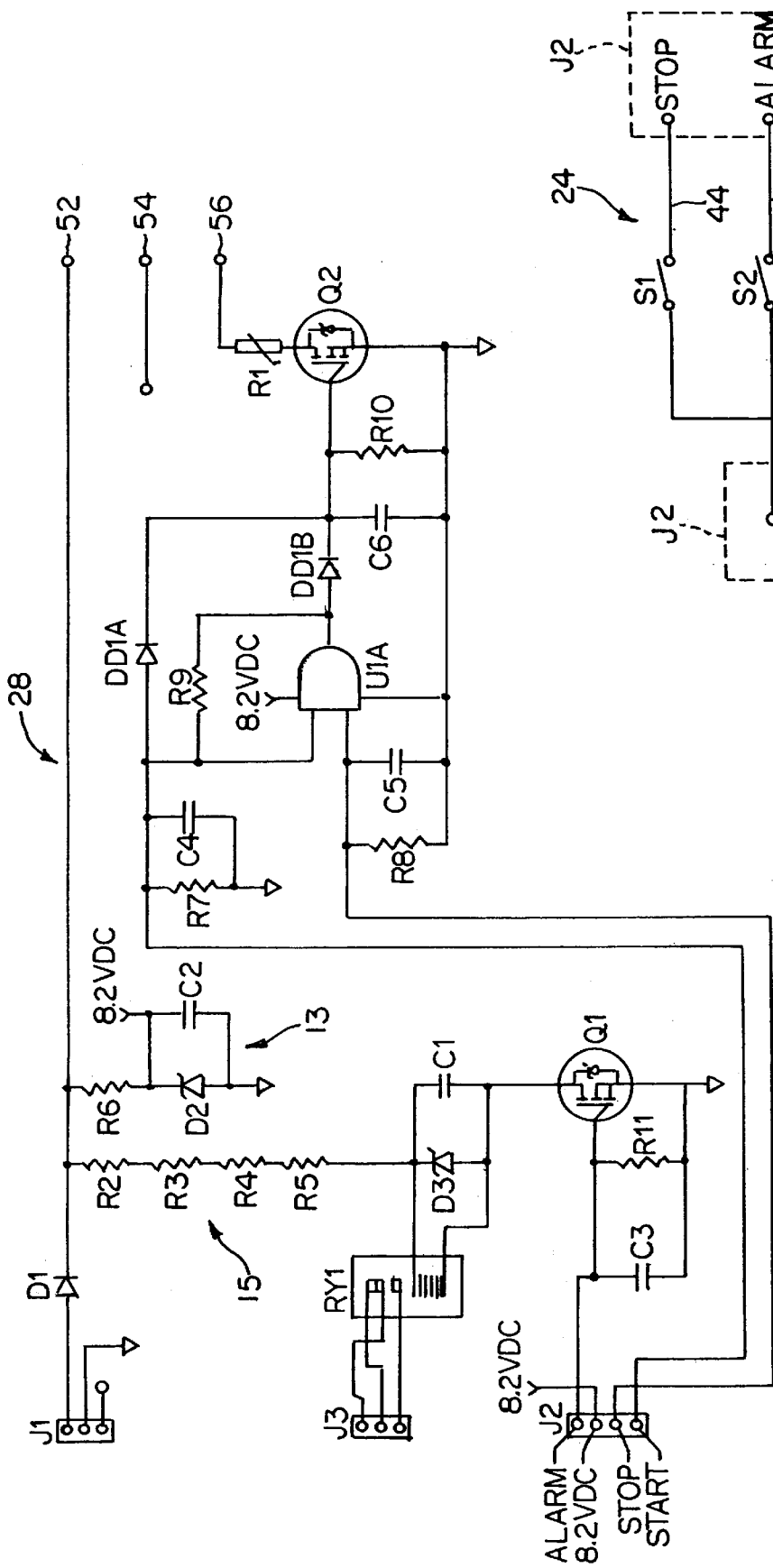
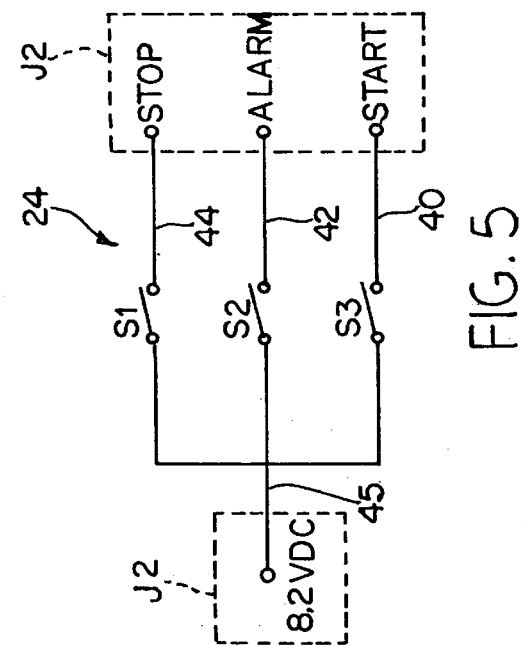
FIG. 4
FIG. 5

US 6,499,961 B1

SOLID STATE LIQUID LEVEL SENSOR AND PUMP CONTROLLER

BACKGROUND OF THE INVENTION

1. Field of the Invention.

The present invention relates generally to a control circuit for a pump motor, and more particularly to a liquid level control circuit which automatically maintains the liquid level in a reservoir within a predetermined range.

2. Description of the Related Art.

Previous liquid level controlling devices typically include three separate assemblies: a reservoir assembly, a pump assembly, and a main control board. The reservoir assembly uses a magnet float/magnetic reed switch configuration to sense the level of liquid in the reservoir. Three magnetic reed switches situated within the reservoir at different levels provide signals to the main control board when the liquid level brings the magnetic float into proximity with the switches. These signals activate and deactivate a separately packaged, thermally protected, electrically isolated pump to adjust the liquid level. The main control board uses a power transformer to derive power for its electronics and an electromechanical relay to activate and deactivate the pump. An additional electromechanical relay is used to activate an alarm circuit when the liquid level reaches a predetermined level. This transformer/multiple relay configuration results in substantial power consumption, even in a standby condition when the pump is not active.

SUMMARY OF THE INVENTION

The present invention provides a liquid level controller having a reservoir assembly and a control board/pump assembly. The reservoir assembly includes sensors which sense the liquid level in the reservoir and provide signals to the control board/pump assembly indicating the liquid level. The control board/pump assembly includes a control circuit having a line voltage rectifier and two separate resistive power supplies. One supply powers the pump control circuit. The other supply is used to activate an alarm through an alarm relay, but only consumes power when the alarm is activated. A solid-state MOSFET transistor and a CMOS logic gate activate and deactivate the pump and provide the necessary pump hysteresis. This solid-state circuit is reliable in operation and consumes low power during pumping and when in the standby condition.

The present invention provides a circuit for maintaining the level of liquid in a reservoir by controlling the operation of a pump for removing liquid from the reservoir in response to a start signal from a liquid level sensor indicating that the liquid level is outside a desired range. The circuit includes a resistive power supply to power the circuit, a logic gate for outputting a pump signal in response to receipt of the level signal, and a transistor coupled between the logic gate and the pump. The transistor enables the pump in response to receipt of the pump signal.

The present invention further provides a controller for a liquid reservoir having a sensor disposed within the reservoir. The sensor outputs a start signal indicating a level of the liquid in the reservoir. The controller includes a control circuit coupled to the sensor for receiving the start signal, and a non-isolated pump connected to the control circuit. The pump adjusts the liquid level when activated. The control circuit activates the pump in response to receipt of the start signal.

The present invention further provides a controller for a device having a liquid reservoir and an alarm, including a first resistive power supply for converting an AC power input to a first DC voltage, a logic circuit powered by the first DC voltage, a non-isolated pump coupled to the logic circuit, a second resistive power supply for converting the AC power input to a second DC voltage, and an alarm circuit using the second DC voltage to activate the alarm.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 4 is a schematic diagram of the control board/pump assembly of FIG. 3; and

FIG. 5 is a schematic diagram of a reservoir assembly including three reed switches.

Figure 1:
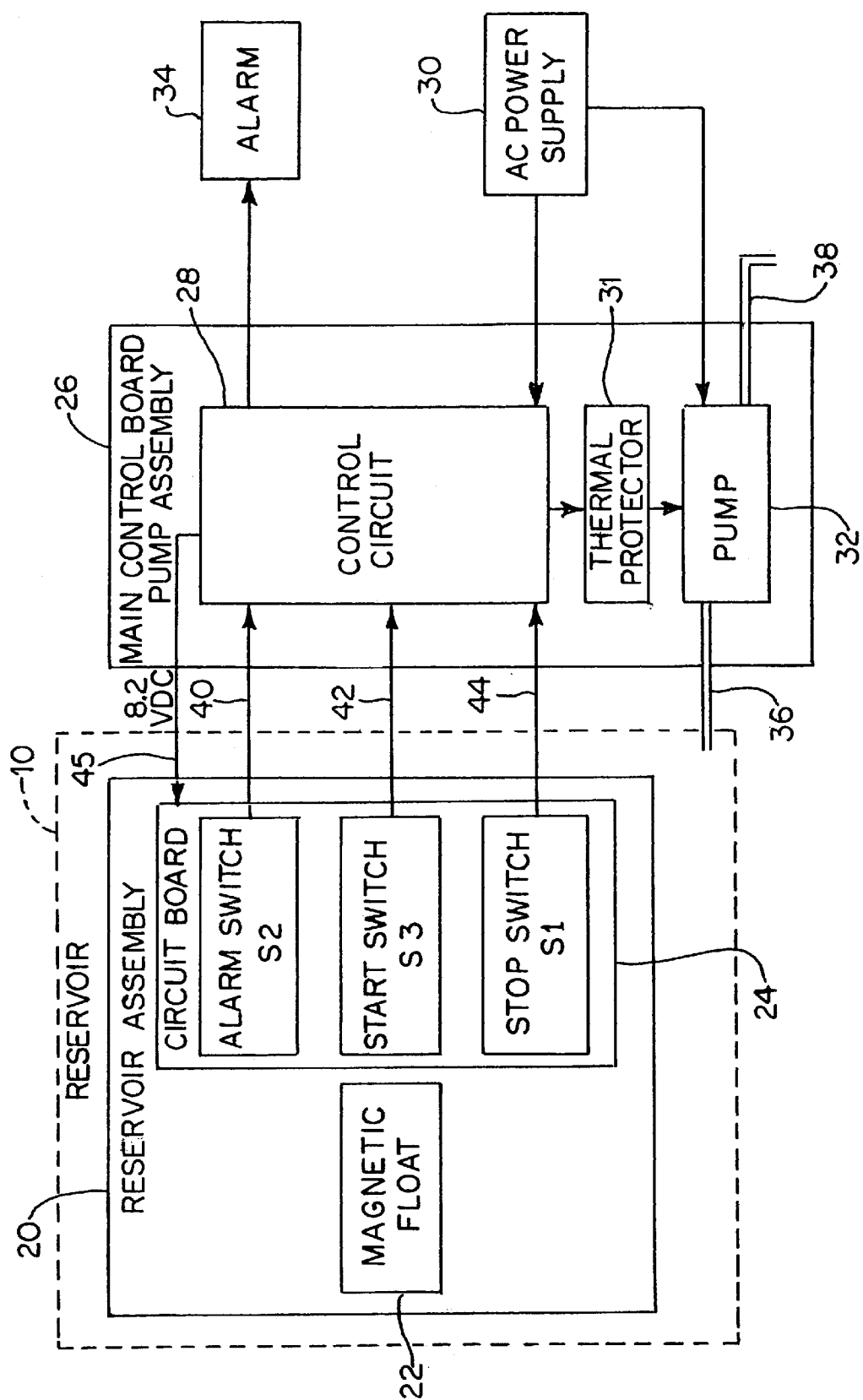
FIG. 1 is a block diagram of a liquid level controller according to the present invention.

Corresponding reference characters indicate corresponding parts throughout the several views. Although the drawings represent embodiments of the present invention, the drawings are not necessarily to scale and certain features may be exaggerated to better illustrate and explain the present invention.

DESCRIPTION OF EMBODIMENTS OF THE INVENTION

The embodiments disclosed below are not intended to be exhaustive or to limit the invention to the precise forms disclosed. Rather, the embodiments are disclosed to enable one skilled in the art to practice the invention.

Referring to FIG. 1, a liquid level controller according to the present invention is used to control the liquid level in an enclosed reservoir 10. The controller generally includes a reservoir assembly 20 and a circuit board referred to as a control board/pump assembly 26.

Reservoir assembly 20 is disposed within reservoir 10 and includes a magnetic float 22 and a circuit board 24 to which are mounted reed switches S1, S2, and S3. Reed switches S1, S2, S3 are electrically connected to control board/pump assembly 26 by wires 40, 42, 44. Wire 45 carries 8.2 VDC from control board/pump assembly 26 to circuit board 24.

Figure 2:
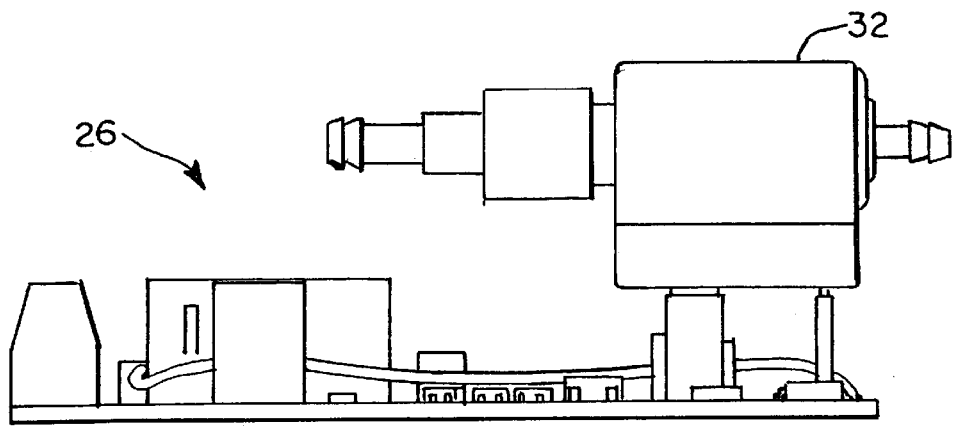
FIG. 2 is a side elevational view of a control board/pump assembly of the liquid level controller of FIG. 1.
Figure 3:
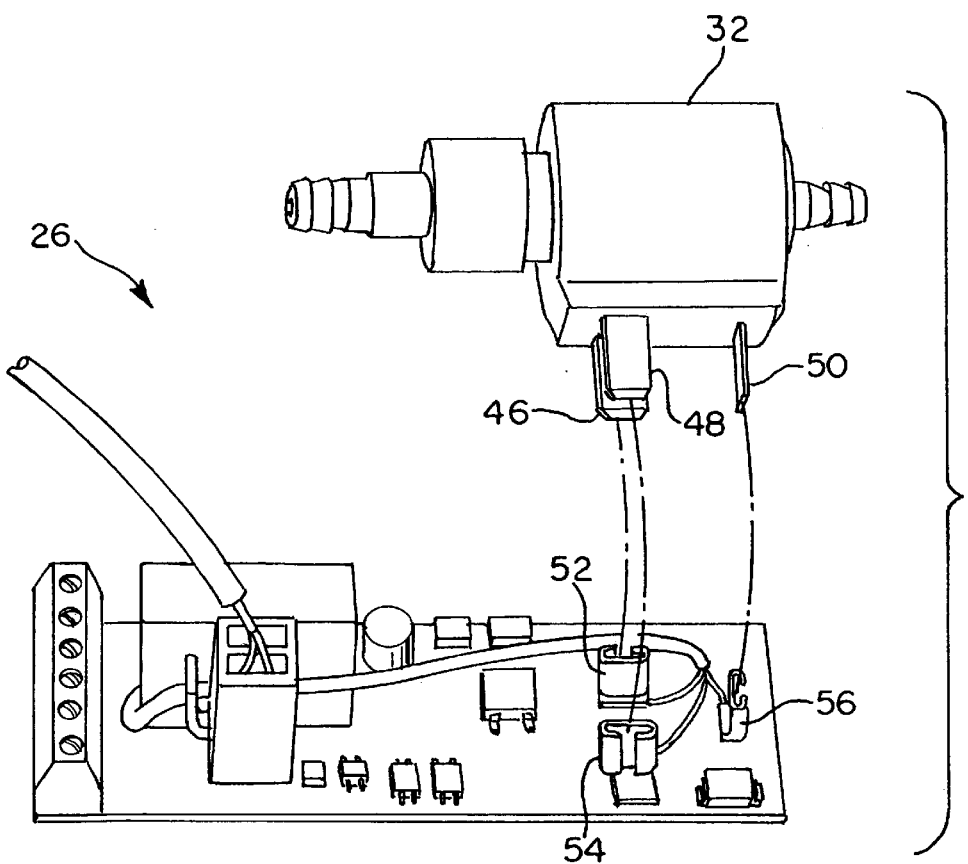
FIG. 3 is a perspective view of the control board/pump assembly of FIG. 2.

Control board/pump assembly 26 generally includes a control circuit 28, a thermal protector 31, and a pump 32. Thermal protector 31 and pump 32 are encapsulated on control board/pump assembly 26. As shown in FIGS. 2 and 3, pins 46, 48 and 50 of pump 32 connect to control board/pump assembly sockets 52, 54 and 56, respectively. An AC power supply 30 provides 230 VAC to control circuit 28 and pump 32. An alarm 34 is electrically connected to control circuit 28. Tubing 36 fluidly connects reservoir 10 to pump 32, and tubing 38 provides a drain path for the liquid removed from reservoir 10 by pump 32.

Referring now to FIG. 4, control circuit 28 receives 230 VAC power through connector J1. The high side of the power signal is rectified by diode D1. The rectified signal is provided to a pair of resistive power supplies 13, 15 and pump 32 at pin 52. One resistive power supply 13 includes resistor R6, zener diode D2, and capacitor C2 and provides 8.2 VDC to other components in control circuit 28 and reed switches S1, S2, S3 through connector J2. The other resistive power supply 15 includes resistors R2, R3, R4, R5, zener diode D3, and capacitor C1 and provides 24 VDC to alarm 34 as further described below.

As shown in FIG. 5, the 8.2 VDC signal is provided to one side of each of reed switches S1, S2, S3 on circuit board 24 of reservoir assembly 20. The other side of reed switches S1, S2, S3 are connected to connector J2 by wires 44, 42, 40 to supply a stop input, a start input, and an alarm input, respectively, to control circuit 28. In reservoir 10, reed switches S1, S2, S3 are arranged on circuit board 24 so that switch S1 is the lowest relative to the liquid level, switch S2 is the highest, and switch S3 is between switch S1 and switch S2. It should be understood that any of a variety of alternative level sensing techniques maybe employed according to principles well known in the art. For example, reed switches S1, S2, S3 may readily be replaced with hall effect sensors or capacitive sensors by one of ordinary skill in the art.

The stop input provided by stop switch S1 is either an open or 8.2 VDC and is connected to a first input of the CMOS AND gate U1A. The stop input is 0 VDC (logic "0") when stop switch S1 is open and 8.2 VDC (logic "1") when stop switch S1 is closed. Resistor R8 is a pull-down resistor when stop switch S1 is open and combines with capacitor C5 to provide a delay when switch S1 transitions from closed to open.

The start input provided by start switch S3 is either an open or 8.2 VDC and is connected to a second input of AND gate U1A. The start input is 0 VDC (logic "0") when start switch S3 is open and 8.2 VDC (logic "1") when start switch S3 is closed. Resistor R7 is a pull-down resistor when start switch S3 is open and combines with capacitor C4 to provide a delay when start switch S3 transitions from closed to open. The start input is also connected through diode DD1A to the gate of the pump MOSFET transistor Q2 to turn on transistor Q2 when the start input is a logic "1."

The output of AND gate U1A is connected to the gate of pump transistor Q2 through diode DD1B. Resistor R10 and capacitor C6 combine to provide a delay when the input to the gate of pump transistor Q2 transitions from a logic "1" to a logic "0." The output of AND gate U1A is also connected via resistor R9 to the second input of AND gate U1A, which is connected to the start input. Resistor R9 is a hold-up when the output of AND gate U1A is a logic "1" and the start input transitions from a logic "1" to a logic "0."

The source of pump transistor Q2 is connected to an electrical common and the drain is connected through thermal protector 31 to pump 32 at pin 56. Thermal protector 31 protects pump 32 from excessive current or excessive temperature or both by interrupting power to pump 32 according to principles commonly known in the art. When pump transistor Q2 is on, it provides a path to ground for the power to pump 32.

Switch S2 provides an alarm input to control circuit 28 through connector J2 as either an open or 8.2 VDC. The alarm input is connected to the gate of the alarm MOSFET transistor Q1. The alarm input at the gate of alarm transistor Q1 is 0 VDC (logic "0") when alarm switch S2 is open and 8.2 VDC (logic "1") when alarm switch S2 is closed. Resistor R11 is a pull-down resistor when alarm switch S2 is open, and combines with capacitor C3 to provide a delay when alarm switch S2 transitions from closed to open.

The source of alarm transistor Q1 is connected to the electrical common and the drain is connected to capacitor C1, the anode of zener diode D3 of 24 VDC resistive power supply 15, and an input of relay RY1. When alarm transistor Q1 is on, it provides a path to ground for relay RY1 such that power supply 15 generates 24 VDC across the input pins of relay RY1. Alarm 34 is connected to relay RY1 through connector J3. When relay RY1 is energized (with 18 to 24 volts across its input pins, depending upon the AC cycle) the circuit for alarm 34 is completed and alarm 34 will signal as is further described below. Power supply 15 remains inactive except when the alarm input is provided by alarm switch S2.

In operation, the present invention is used to control the liquid level in reservoir 10 by activating pump 32 at appropriate times in response to signals from switches S1, S2, S3. When the liquid begins to rise in reservoir 10, stop switch S1 is closed by its proximity to magnetic float 22. 8.2 VDC is then present at the stop input of connector J2, generating a logic "1" on the first input of AND gate U1A. This does not cause pump 32 to run since the second input of gate U1A is still a logic "0." As the liquid continues to rise in reservoir 10, start switch S3 is closed by magnetic float 22. Start switch S3 provides a logic "1" start signal to the second input pin of AND gate U1A through the start input of connector J2 indicating that the liquid level is outside the desired range. When both inputs of AND gate U1A are logic "1," the output of AND gate U1A becomes a logic "1," switching on pump transistor Q2 which provides a path to ground for pump 32.

Under normal conditions, pump 32 will begin to lower the liquid level in reservoir 10. As the liquid level falls below the level of the start switch S3, switch S3 opens, but pull-up resistor R9 holds the second input of AND gate U1A to a logic "1." Thus, the output of AND gate U1A remains a logic "1." When the liquid level falls below the level of stop switch S1, switch S1 opens, resulting in a logic "0" at the first input of AND gate U1A. This causes the output of AND gate U1A to transition to a logic "0," deactivating pump transistor Q2, which in turn deactivates pump 32.

If the liquid level in reservoir 10 continues to rise even though pump 32 is operating, the liquid level may rise to the level of switch S2 and cause switch S2 to close. Alarm switch S2 then provides a logic "1" through connector J2 to the gate of alarm transistor Q1. Transistor Q1 thus provides a path to ground for relay RY1 which turns on alarm 34. Alarm 34 may alert an operator or automatically shutdown the system producing the liquid in the reservoir, or both. In the above configuration, alarm 34 consumes no power until alarm switch S2 closes and turns on alarm transistor Q1.

The voltage levels and logic values of the above embodiment maybe different depending on the application. Although the present invention has been shown and described in detail, the same is to be taken by way of example only and not by way of limitation. Numerous changes can be made to the embodiments described above without departing from the scope of the invention. This application is therefore intended to cover any variations, uses, or adaptations of the invention using its general principles. Further, this application is intended to cover such departures from the present disclosure as come within known or customary practice in the art to which this invention pertains.

What is claimed is:

1. A circuit for maintaining the level of liquid in a reservoir by controlling the operation of a pump for removing liquid from the reservoir in response to a start signal from a liquid level sensor indicating that the liquid level is outside a desired range, the circuit including:

a resistive power supply to power the circuit;

a logic gate for outputting a pump signal in response to receipt of the start signal; and a transistor electrically connected between the logic gate and the pump, the transistor enabling the pump in response to receipt of the pump signal.

2. The circuit of claim 1 wherein the level sensor provides a stop signal indicating that the liquid level is within the desired range, the logic gate outputting the pump signal in response to simultaneous receipt of both the start signal and the stop signal.

3. The circuit of claim 1 wherein the logic gate is a CMOS AND gate.

4. The circuit of claim 1 wherein the transistor is a MOSFET transistor, the logic gate providing the pump signal to a gate of the transistor.

5. The circuit of claim 1 wherein the pump is non-isolated.

6. The circuit of claim 1 further including a circuit board including the resistive power supply, the transistor, and the pump, the pump being encapsulated on the board.

7. The circuit of claim 1 further including a second resistive power supply for powering an alarm, the second resistive power supply being inactive except when power is required to operate the alarm.

8. The circuit of claim 7 wherein the level sensor provides an alarm signal, the circuit further including a transistor being activated by the alarm signal, activation of the transistor causing the second resistive power supply to activate a relay coupled to the alarm, thereby activating the alarm.

9. A controller for a liquid reservoir having a sensor disposed within the reservoir, the sensor outputting a start signal indicating a level of the liquid in the reservoir, the controller including:

a control circuit coupled to the sensor for receiving the start signal, the control circuit including a transistor; and a non-isolated pump electrically connected to the transistor, the pump adjusting the liquid level when activated;

wherein the control circuit activates the pump in response to receipt of the start signal.

10. The controller of claim 9 wherein the transistor activates the pump when enabled and deactivates the pump when disabled.

11. The controller of claim 10 wherein the control circuit includes a logic gate for receiving the start signal, the logic gate enabling the transistor in response to receipt of the start signal.

12. The controller of claim 11 wherein the logic gate is a CMOS AND gate.

13. The controller of claim 10 wherein the transistor is a MOSFET transistor.

14. The controller of claim 10 further including a circuit board, the transistor and the pump being mounted to the circuit board.

15. The controller of claim 9 wherein the sensor outputs a stop signal, the control circuit activating the pump in response to simultaneous receipt of both the start signal and the stop signal.

16. The controller of claim 9 wherein the control circuit includes a resistive power supply to power the control circuit.

17. The controller of claim 9 wherein the control circuit includes a first resistive power supply providing a first output voltage to power the control circuit, and a second resistive power supply providing a second output voltage to activate an alarm coupled to the control circuit.

18. The controller of claim 9 wherein the control circuit includes a resistive power supply for powering an alarm, the resistive power supply being inactive except when power is required to operate the alarm.

19. The controller of claim 18 wherein the sensor outputs an alarm signal, the control circuit further including a transistor being activated by the alarm signal, activation of the transistor causing the resistive power supply to activate a relay coupled to the alarm, thereby activating the alarm.

20. A controller for a device having a liquid reservoir and an alarm, including:

a first resistive power supply for converting an AC power input to a first DC voltage;

a control circuit powered by the first DC voltage;

a non-isolated pump coupled to the control circuit;

a second resistive power supply for converting the AC power input to a second DC voltage; and an alarm circuit using the second DC voltage to activate the alarm.

21. The controller of claim 20 wherein a sensor disposed in the reservoir provides a start signal to the control circuit when the level of liquid in the reservoir reaches a first predetermined level, the control circuit outputting a pump signal in response to receipt of the start signal to activate the pump, the pump adjusting the level of liquid in the reservoir.

22. The controller of claim 21 wherein the sensor provides a stop signal to the control circuit when the level of liquid in the reservoir reaches a second predetermined level, the control circuit outputting the pump signal in response to simultaneous receipt of both the start signal and the stop signal.

23. The controller of claim 21 wherein the control circuit includes a logic gate and a transistor coupled between the logic gate and the pump, the transistor enabling the pump in response to receipt of the pump signal.

24. The controller of claim 23 wherein the logic gate is a CMOS AND gate.

25. The controller of claim 23 wherein the transistor is a MOSFET transistor, the logic gate providing the pump signal to a gate of the transistor.

26. The controller of claim 20 further including a circuit board including the first resistive power supply and the pump, the pump being encapsulated on the board.

27. The controller of claim 20 wherein the second resistive power supply is inactive except when power is required to operate the alarm.

28. The controller of claim 20 wherein a sensor disposed in the reservoir provides an alarm signal, the control circuit further including a transistor being activated by the alarm signal, activation of the transistor causing the second resistive power supply to activate a relay coupled to the alarm, thereby activating the alarm.

29. A circuit for maintaining the level of liquid in a reservoir by controlling the operation of a pump for removing liquid from the reservoir in response to a start signal from a liquid level sensor indicating that the liquid level is outside a desired range, the circuit including:

a resistive power supply to power the circuit;

a logic gate for outputting a pump signal in response to receipt of the start signal; and a transistor coupled between the logic gate and the pump, the transistor enabling the pump in response to receipt of the pump signal;

wherein the logic gate is a CMOS AND gate.

30. A circuit for maintaining the level of liquid in a reservoir by controlling the operation of a pump for removing liquid from the reservoir in response to a start signal from a liquid level sensor indicating that the liquid level is outside a desired range, the circuit including:

a resistive power supply to power the circuit;

a logic gate for outputting a pump signal in response to receipt of the start signal; and a transistor coupled between the logic gate and the pump, the transistor enabling the pump in response to receipt of the pump signal;

wherein the transistor is a MOSFET transistor, the logic gate providing the pump signal to a gate of the transistor.

31. A circuit for maintaining the level of liquid in a reservoir by controlling the operation of a pump for removing liquid from the reservoir in response to a start signal from a liquid level sensor indicating that the liquid level is outside a desired range, the circuit including:

a resistive power supply to power the circuit;

a logic gate for outputting a pump signal in response to receipt of the start signal;

a transistor coupled between the logic gate and the pump, the transistor enabling the pump in response to receipt of the pump signal; and a circuit board including the resistive power supply, the transistor, and the pump, the pump being encapsulated on the board.

32. A circuit for maintaining the level of liquid in a reservoir by controlling the operation of a pump for removing liquid from the reservoir in response to a start signal from a liquid level sensor indicating that the liquid level is outside a desired range, the circuit including:

a resistive power supply to power the circuit;

a logic gate for outputting a pump signal in response to receipt of the start signal;

a transistor coupled between the logic gate and the pump, the transistor enabling the pump in response to receipt of the pump signal; and a second resistive power supply for powering an alarm, the second resistive power supply being inactive except when the power is required to operate the alarm.

33. The circuit according to claim 32, wherein the level sensor provides an alarm signal, the circuit further including a transistor being activated by the alarm signal, activation of the transistor causing the second resistive power supply to activate a relay coupled to the alarm, thereby activating the alarm.

34. A controller for a liquid reservoir having a sensor disposed within the reservoir, the sensor outputting a start signal indicating a level of the liquid in the reservoir, the controller including:

a control circuit coupled to the sensor for receiving the start signal; and a non-isolated pump connected to the control circuit, the pump adjusting the liquid level when activated;

wherein the control circuit activates the pump in response to receipt of the start signal;

wherein the control circuit includes a transistor coupled to the pump, the transistor activating the pump when enabled and deactivating the pump when disabled;

wherein the control circuit includes a logic gate for receiving the start signal, the logic gate enabling the transistor in response to receipt of the start signal;

wherein the logic gate is a CMOS AND gate.

35. A controller for a liquid reservoir having a sensor disposed within the reservoir, the sensor outputting a start signal indicating a level of the liquid in the reservoir, the controller including:

a control circuit coupled to the sensor for receiving the start signal; and a non-isolated pump connected to the control circuit, the pump adjusting the liquid level when activated;

wherein the control circuit activates the pump in response to receipt of the start signal;

wherein the control circuit includes a transistor coupled to the pump, the transistor activating the pump when enabled and deactivating the pump when disabled;

wherein the transistor is a MOSFET transistor.

36. A controller for a liquid reservoir having a sensor disposed within the reservoir, the sensor outputting a start signal indicating a level of the liquid in the reservoir, the controller including:

a control circuit coupled to the sensor for receiving the start signal; and a non-isolated pump connected to the control circuit, the pump adjusting the liquid level when activated; and a circuit board, the transistor and the pump being mounted to the circuit board;

wherein the control circuit activates the pump in response to receipt of the start signal;

wherein the control circuit includes a transistor coupled to the pump, the transistor activating the pump when enabled and deactivating the pump when disabled.

37. A controller for a liquid reservoir having a sensor disposed within the reservoir, the sensor outputting a start signal indicating a level of the liquid in the reservoir, the controller including:

a control circuit coupled to the sensor for receiving the start signal; and a non-isolated pump connected to the control circuit, the pump adjusting the liquid level when activated;

wherein the control circuit activates the pump in response to receipt of the start signal;

wherein the control circuit includes a first resistive power supply providing a first output voltage to power the control circuit, and a second resistive power supply providing a second output voltage to activate an alarm coupled to the control circuit.

38. A controller for a liquid reservoir having a sensor disposed within the reservoir, the sensor outputting a start signal indicating a level of the liquid in the reservoir, the controller including:

a control circuit coupled to the sensor for receiving the start signal; and a non-isolated pump connected to the control circuit, the pump adjusting the liquid level when activated;

wherein the control circuit activates the pump in response to receipt of the start signal;

wherein the control circuit includes a resistive power supply for powering an alarm, the resistive power supply being inactive except when power is required to operate the alarm.

39. The controller of claim 38, wherein the sensor outputs an alarm signal, the control circuit further including a transistor being activated by the alarm signal, activation of the transistor causing the resistive power supply to activate a relay coupled to the alarm, thereby activating the alarm.

* * * * *

UNITED STATES PATENT AND TRADEMARK OFFICE
CERTIFICATE OF CORRECTION

PATENT NO. : 6,499,961 B1
DATED : December 31, 2002
INVENTOR(S) : Arnold G. Wyatt et al.

It is certified that error appears in the above-identified patent and that said Letters Patent is hereby corrected as shown below:

<u>Title page,</u>
Below Item [22], insert the following:

-- Related U.S. Application Data
[63] Provisional application No. 60/189,827, filed on
March 16, 2000 and Provisional application No. 60/191,809, filed on March 24, 2000. --

<u>Column 1,</u>
Line 3, insert the following:
This application claims priority of and is based upon U.S. Provisional Patent Application Serial No. 60/189,827 filed March 16, 2000 and U.S. Provisional Patent Application Serial No. 60/191,809 filed March 24, 2000.

Signed and Sealed this

Twentieth Day of May, 2003

JAMES E. ROGAN
*Director of the United States Patent and Trademark Office*